US008112278B2

(12) United States Patent
Burke

(10) Patent No.: US 8,112,278 B2
(45) Date of Patent: Feb. 7, 2012

(54) ENHANCING THE RESPONSE OF BIOMETRIC ACCESS SYSTEMS

(75) Inventor: Christopher John Burke, Ramsgate (AU)

(73) Assignee: Securicom (NSW) Pty Ltd, New South Wales (AU)

(*) Notice: Subject to any disclaimer, the term of this patent is extended or adjusted under 35 U.S.C. 154(b) by 972 days.

(21) Appl. No.: 11/792,975

(22) PCT Filed: Dec. 13, 2005

(86) PCT No.: PCT/AU2005/001885
§ 371 (c)(1),
(2), (4) Date: Apr. 8, 2008

(87) PCT Pub. No.: WO2006/063392
PCT Pub. Date: Jun. 22, 2006

(65) Prior Publication Data
US 2009/0043578 A1    Feb. 12, 2009

(30) Foreign Application Priority Data

Dec. 13, 2004 (AU) .................................. 2004907108

(51) Int. Cl.
*G10L 17/00* (2006.01)
(52) U.S. Cl. ........................................................ 704/246
(58) Field of Classification Search .................. 704/246
See application file for complete search history.

(56) References Cited

U.S. PATENT DOCUMENTS 6,636,973 B1  10/2003 Novoa et al.
7,826,464 B2 * 11/2010 Fedorov ........................ 370/401
2002/0112177 A1   8/2002 Voltmer et al.
2003/0037004 A1   2/2003 Buffum et al.
2003/0123619 A1   7/2003 McKinnon et al.

FOREIGN PATENT DOCUMENTS

EP    1 239 422      9/2002
JP    2000-330589   11/2000

OTHER PUBLICATIONS

Toh, Kar-Ann "Fingerprint and Speaker Verification Decisions Fusion." Proceedings of the 12$^{th}$ International Conference on Image Analysis and Processing (2003) pp. 17-19.
Phelps, E., et al. "Soni-Key Voice Controlled Door Lock." Proceedings of the IEEE 26$^{th}$ Annual Northeast Bioengineering Conference (2000) pp. 165-166.
Drahansky, M., et al. "Biometric Security Systems: Robustness of the Fingerprint and Speech Technologies." Proceedings of the International Workshop on Biometric Technologies—BT2004 (2004) pp. 99-103.

* cited by examiner

*Primary Examiner* — Susan McFadden
(74) *Attorney, Agent, or Firm* — Ladas & Parry LLP

(57) ABSTRACT

Disclosed are arrangements that provide security for items to which access is restricted by providing a single layer of security requiring a biometric signature (101) for access. A memory-space reduction approach reduces the search time to identify a matching biometric signature, this based on an auxiliary input (112) that is vocally uttered by a user seeking access to the controlled item (811). The disclosed arrangements can also use the auxiliary codes as control signals to expand the utility of the disclosed voice controlled memory partitioning arrangements.

13 Claims, 11 Drawing Sheets

ENHANCING THE RESPONSE OF BIOMETRIC ACCESS SYSTEMS

FIELD OF THE INVENTION

The present invention relates generally to security access systems, and particularly, to systems using biometric information of a user to authenticate the identity of a user seeking access to the secure facility.

BACKGROUND

Security systems providing access to secured facilities based upon provision, by someone seeking access, of biometric information, require typically that a database of biometric signatures be searched for a match with a biometric signal (also referred to as a biometric input) provided by a user seeking access. Thus, for example, the user may present a fingerprint to a fingerprint scanning device, after which the security system will compare the received fingerprint with a database of fingerprint signatures in order to determine if the user is authorised to access to facility. Since biometric signatures are relatively complex, the search procedure can take a considerable time, particularly if the database of signatures is large. The time taken for this search can, if it becomes too large, cause inconvenience to users wishing to access the facility, and ultimately the use of such systems can fall into disfavour unless the search times are acceptably small.

Some present systems seek to reduce the search time by providing the user with a smartcard that contains the biometric signature of the user. In order to use this type of system the user firstly swipes the card at a card reader mounted adjacent to the secured facility, and then presses his or her finger against a fingerprint scanner. The system then matches the fingerprint signature generated by the fingerprint scanner against the fingerprint signature read from the card. This system does not maintain a database of fingerprint signatures, and operates on the basis that a user who presents such a card and who is able to provide a fingerprint signature that matches the signature of the card is entitled to access to the facility. Clearly this type of system suffers from the disadvantage that if a user becomes a security risk, for example, and the owners of the secure facility wish to exclude that user, then ancillary information is required in order to prevent such a user from accessing the facility, since the system as previously described will find a match between the information on the swiped card, and the fingerprint presented to the scanner.

Other current systems adopt a different approach which reduces the search space which is to be searched for a biometric signature match by asking the user to input an auxiliary PIN number. These systems require the user to firstly enter their PIN using a keypad, for example, after which the user presses their finger against a fingerprint scanner. The system uses the PIN to form a sub-address, thereby identifying a specific partition within the signature database, after which the system searches the aforementioned memory partition for a match with the fingerprint scanned by the fingerprint scanner. Although this system achieves a more rapid database search, this approach requires the user to remember a secret PIN and to enter it using keyboard. This type of system regards the PIN and the fingerprint input by the user at the fingerprint scanner to be two complimentary layers of security, thereby providing a higher level of security than a system based purely on the biometric signature comparison. However, this system is more cumbersome to use, and potential users can find the additional complexity undesirable.

Other systems use more powerful processors in order to search the signature database in less time. As the size of these databases increases, however, it becomes increasingly difficult and expensive to continuously upgrade the processing speed of the search computer.

SUMMARY

It is an object of the present invention to substantially overcome, or at least ameliorate, one or more disadvantages of existing arrangements.

Disclosed are arrangements, referred to as voice controlled memory partitioning arrangements, that seeks to address the above problems by providing a security system based upon a single layer of security using the biometric signature feature, and using a memory-space reduction approach based on an auxiliary CODE input that is vocally uttered by a user seeking access to a secured facility, in order to reduce the memory space that needs to be searched. This CODE input that is vocally uttered by the user is referred to in this description as a vocally uttered CODE input or a voice prompt. The disclosed arrangements can also use the auxiliary codes as control signals to expand the utility of the disclosed voice controlled memory partitioning arrangements.

The strength of this approach lies in the realisation that the biometric signature constitutes an extremely reliable security parameter, which does not need, in ordinary applications, an additional layer of security in the form of a PIN that is entered via a keyboard, this being a secure type of data interface. Instead, the disclosed arrangement takes advantage of the strength of the biometric security feature by providing a non-secure auxiliary input in the form of a voice prompt. The disclosed security arrangement does not perform voice recognition upon the actual voice of the user pronouncing the code, but merely word recognition directed at the auxiliary input code which may be some sort of easily remembered word. This auxiliary input code is used to reduce the search space, by identifying that part of the signature database containing the matching signature which is to be compared against the biometric signal provided by the person seeking access. This makes the processing speed of the biometric database search much faster since only the reduced search space need be searched for the matching signature. The disclosed system is far more user friendly than the current systems which use an auxiliary input based upon a secret PIN, by reducing the need for the user to remember a secret PIN.

According to a first aspect of the present invention, there is provided a method of authenticating a biometric signal, the method comprising the steps of:

receiving the biometric signal to be authenticated against a matching signature in a signature database;

receiving a vocally uttered code;

identifying, dependent upon the vocally uttered code, that part of the signature database that needs to be searched; and searching the identified part of the signature database for the matching signature.

According to another aspect of the present invention, there is provided a method of providing access to a secure facility, the method comprising the steps of:

receiving a biometric signal;

searching a signature database for a signature matching the biometric signal;

receiving a vocally uttered command; and if said matching signature is found, determining, dependent upon the received voice command, a corresponding command output.

According to another aspect of the present invention, there is provided an apparatus for authenticating a biometric signal, the system comprising:

a biometric detector for receiving the biometric signal to be authenticated against a matching signature in a signature database;

a microphone for receiving a vocally uttered code;

a memory for storing a program; and a processor for executing the program, said program comprising:

code for identifying, dependent upon the vocally uttered code, that part of the signature database that needs to be searched; and code for searching the identified part of the signature database for the matching signature.

According to another aspect of the present invention, there is provided a method of providing access to a secure facility, the method comprising the steps of:

receiving a biometric signal;

searching a signature database for a signature matching the biometric signal;

receiving a vocally uttered command; and if said matching signature is found, determining, dependent upon the received voice command, a corresponding command output.

According to another aspect of the present invention, there is provided a computer program product including a computer readable medium having recorded thereon a computer program for directing a processor to execute a method of authenticating a biometric signal, the program comprising:

code for receiving the biometric signal to be authenticated against a matching signature in a signature database;

code for receiving a vocally uttered code;

code for identifying, dependent upon the vocally uttered code, that part of the signature database that needs to be searched; and code for searching the identified part of the signature database for the matching signature.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
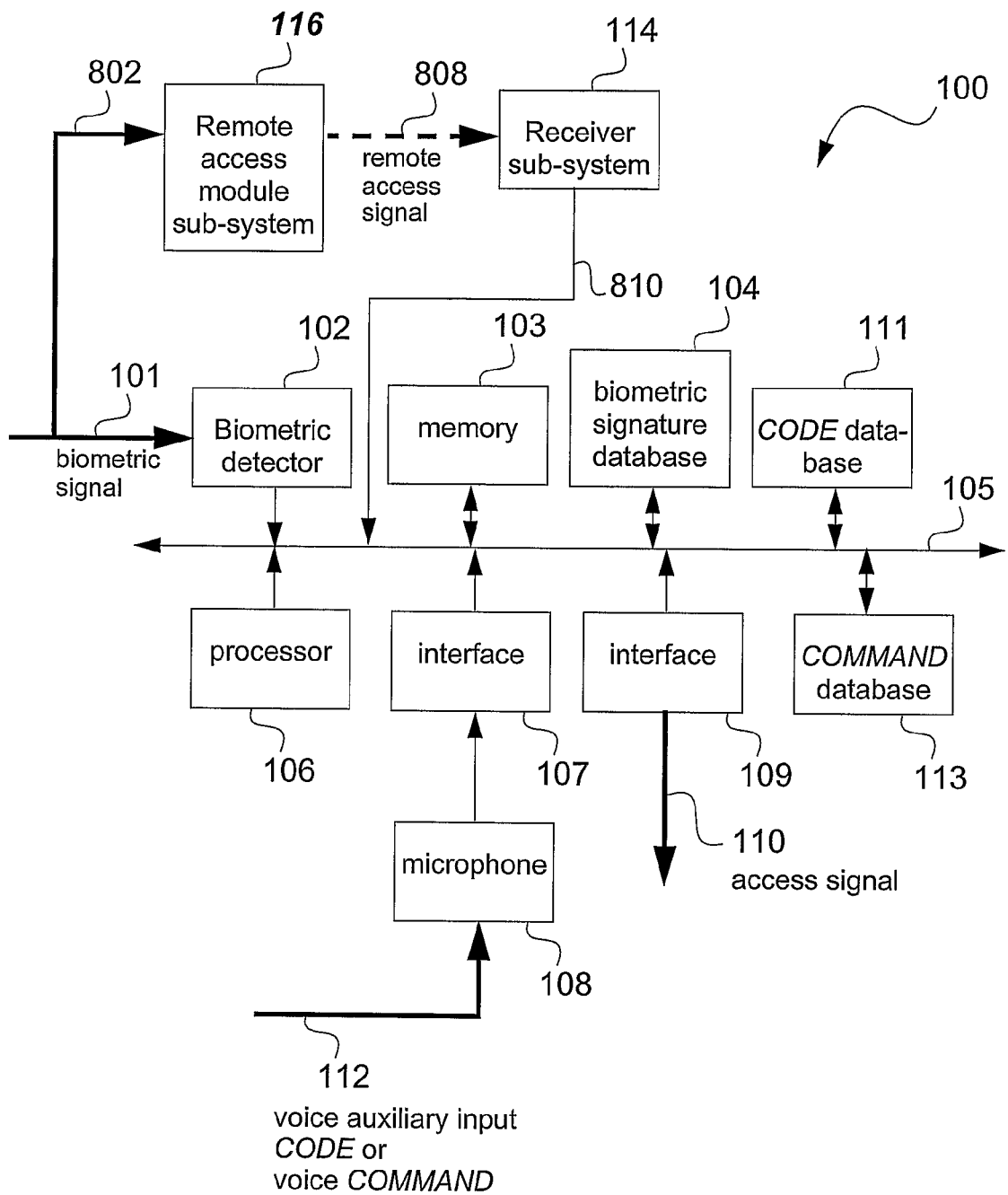
FIG. 1 shows a functional block diagram 100 of the disclosed voice controlled memory partitioning concept used in a biometric security system.

It is to be noted that the discussions contained in the "Background" section relating to prior art arrangements relate to discussions of arrangements which form public knowledge through their use. Such discussions should not be interpreted as a representation by the present inventor or patent applicant(s) that such arrangements in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a functional block diagram 100 of the disclosed voice-assisted biometric security system. The system 100 shows a biometric input (also referred to as a biometric signal) 101 being presented to a biometric detector 102. The biometric detector 102 is typically mounted in a fixed location, conveniently situated next to the secured facility to be accessed. Accordingly, for example, if the secure facility is an entry door, then the biometric detector 102 can be mounted on the doorpost of the door. Alternately, if the secure facility is a personal computer (PC), then the biometric detector 102 can be mounted on the housing of the PC. Alternately, the biometric signal 101 can be applied, as depicted by an arrow 802 (see FIG. 8), to a remote access sub-system 116, this often being implemented as a portable fob carried by a user. The remote access module 116 communicates, as depicted by dashed arrow 808 (see FIG. 8), with a receiver sub-system 114. This arrangement is described in more detail with reference to FIGS. 8-11.

Typically the biometric signal 101 is a fingerprint, and the biometric detector is a fingerprint scanner, noting that this is only one example of a biometric attribute that can be used. Accordingly, retinal eye patterns or face recognition can also be used. The system 100 also has a memory 103 used for storage of intermediate data during access processing, and a signature database 104 that contains biometric signatures of authorised personnel. The system 100 also has a voice pointer database 111 (also referred to as a voice code database) that contains CODE words associated with specific memory partitions within the database 104. The system 100 also has a command database 113, (also referred to as a voice command database) that contains commands each of which is associated with a particular access and/or control signal 708 as described in more detail in relation to FIG. 7. A processor 106 controls the dataflow among the various system components, and also performs the necessary processing. A microphone 108 is connected to a corresponding interface 107 and the user provides the vocally uttered CODE input (also referred to as an auxiliary voice controlled memory partitioning input) 112 to the microphone 108. The user also provides voice commands, as described in regard to FIG. 7, via the microphone 108. An interface 109 tailored to the particular secured facility, provides an access signal 110 if the user providing the biometric signal 101 and the auxiliary voice controlled memory partitioning signal 112 is found to be authorised. The interface 109 also provides the control signals associated with the voice commands, as described in relation to FIG. 7. A bus 105 serves to interconnect the aforementioned system components, enabling the interchange of data and control information.

Figure 2:
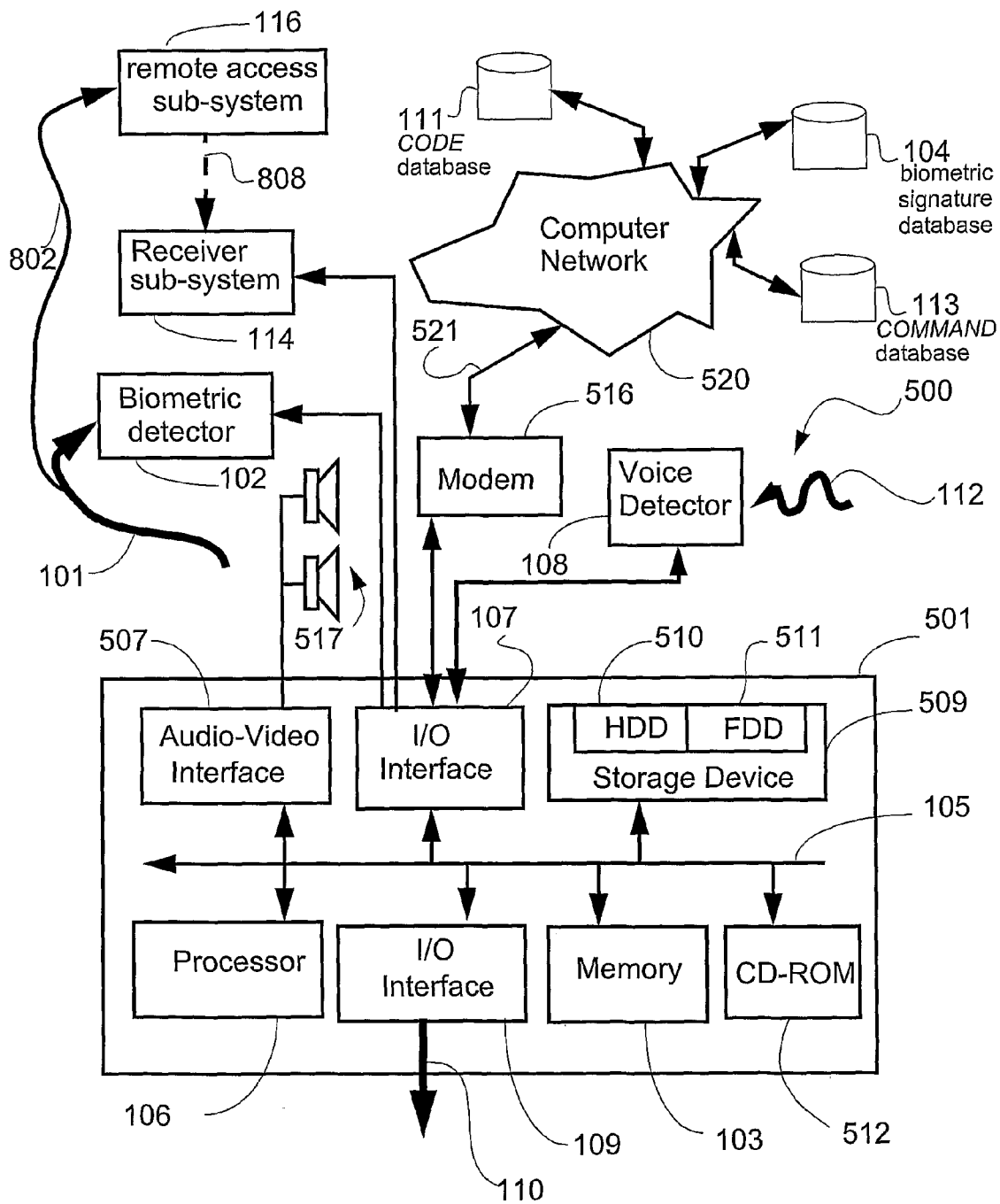
FIG. 2 is a functional block diagram of a general-purpose computer system upon which described methods for voice controlled memory partitioning can be practiced.

FIG. 2 shows how the method for voice controlled memory partitioning lends itself to implementation on a general-purpose computer system 500, such as that shown in FIG. 2 wherein the processes of FIGS. 4-7 and 9-11 may be implemented as software, such as an application program executing within the computer system 500. In particular, the steps of method of voice controlled memory partitioning and multi-channel voice control are effected by instructions in the software that are carried out by the computer. The instructions may be formed as one or more code modules, each for performing one or more particular tasks. The software may also be divided into two separate parts, in which a first part performs the voice controlled memory partitioning methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for voice controlled memory partitioning and multi-channel voice control.

The computer system 500 is formed by a computer module 501, input devices such as the biometric detector 102, the remote access module sub-system 116, the receiver sub-system 114, and the voice detector 108, output devices including loudspeakers 517. A Modulator-Demodulator (Modem) transceiver device 516 is used by the computer module 501 for communicating to and from a communications network 520, for example connectable via a telephone line 521 or other functional medium. The modem 516 can be used to obtain access to the biometric signature database 104 and/or the voice pointer database 111 and/or the command database 113 over the Internet, and other network systems, such as a Local Area Network (LAN) or a Wide Area Network (WAN). Alternately, the aforementioned databases may be incorporated into the computer module 501, typically on a hard disk 510.

The computer module 501 typically includes at least one processor unit 106, and the memory unit 103, for example formed from semiconductor random access memory (RAM) and read only memory (ROM). The module 501 also includes an number of input/output (I/O) interfaces including an audio-video interface 507 that couples to the loudspeakers 517, an I/O interface 109 for outputting the access signal 110, and an interface 107 for the modem 516, the biometric detector 102 and the voice detector 108. In some implementations, the modem 516 may be incorporated within the computer module 501, for example within the interface 107. A storage device 509 is provided and typically includes the hard disk drive 510 and a floppy disk drive 511. A magnetic tape drive (not illustrated) may also be used. A CD-ROM drive 512 is typically provided as a non-volatile source of data. The components 103, 106, 107, 109 and 507, 510, 511 and 512 of the computer module 501, typically communicate via the interconnected bus 105 and in a manner which results in a conventional mode of operation of the computer system 500 known to those in the relevant art. Examples of computers on which the described arrangements can be practised include IBM-PC's and compatibles, Sun Sparcstations or alike computer systems evolved therefrom.

Typically, the voice controlled memory partitioning and multi-channel voice control application program is resident on the hard disk drive 510 and read and controlled in its execution by the processor 106. Intermediate storage of the program and any data fetched from the network 520 may be accomplished using the semiconductor memory 103, possibly in concert with the hard disk drive 510. In some instances, the application program may be supplied to the user encoded on a CD-ROM or floppy disk and read via the corresponding drive 512 or 511, or alternatively may be read by the user from the network 520 via the modem device 516. Still further, the software can also be loaded into the computer system 500 from other computer readable media. The term "computer readable medium" as used herein refers to any storage or transmission medium that participates in providing instructions and/or data to the computer system 500 for execution and/or processing. Computer readable storage media refers to any non-transitory tangible storage medium that provides recorded instructions and/or data to the computer system 500 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 501. Examples of transmission media include radio or infra-red transmission channels as well as a network connection to another computer or networked device, and the Internet or Intranets including e-mail transmissions and information recorded on Websites and the like.

The method of voice controlled memory partitioning and/or multi-channel voice control may alternatively be implemented in dedicated hardware such as one or more integrated circuits performing the functions or sub functions of voice controlled memory partitioning. Such dedicated hardware may include graphic processors, digital signal processors, or one or more microprocessors and associated memories.

Figure 3:
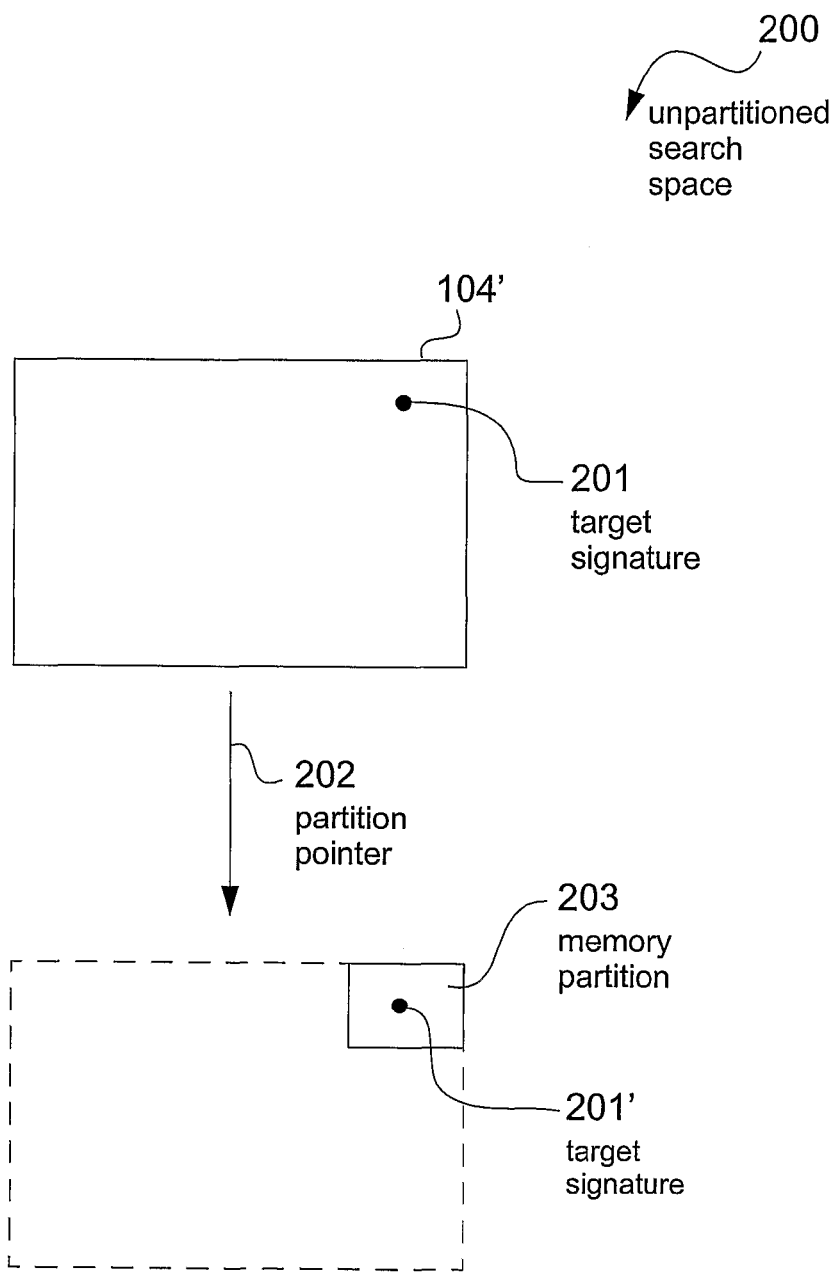
FIG. 3 depicts the search effort relating partitioned and un-partitioned search spaces FIG. 1.

FIG. 3 shows the un-partitioned search space 104' associated with the biometric signature database 104 in FIG. 1. FIG. 3 also depicts a target biometric signature 201 as a point within the un-partitioned search space 104'. Clearly the processor 106 in FIG. 1 will need to search a significant amount of the un-partitioned search space 104' in order to find the target signature 201.

The un-partitioned search space 104' can, however, be partitioned using a sub-address 202 that defines a memory partition 203. The target signature 201' (which corresponds to the target signature 201 within the un-partitioned search space 104') can now be found by searching the memory partition 203 that is defined by the sub-address 202. Clearly the processor 106 can search the memory partition 203 in a much smaller time than will be taken to search the entire un-partitioned search space 104'.

The voice controlled memory partitioning signal 112 serves to define the sub-address 202, thereby facilitating a more rapid search of the biometric signature database 104 when verifying whether a person is authorised to access the secured facility in question. Alternately, as is described in regard to FIG. 5, a sequence of voice controlled memory partitioning signals 112 can be used to construct the sub-address 202.

Figure 4:
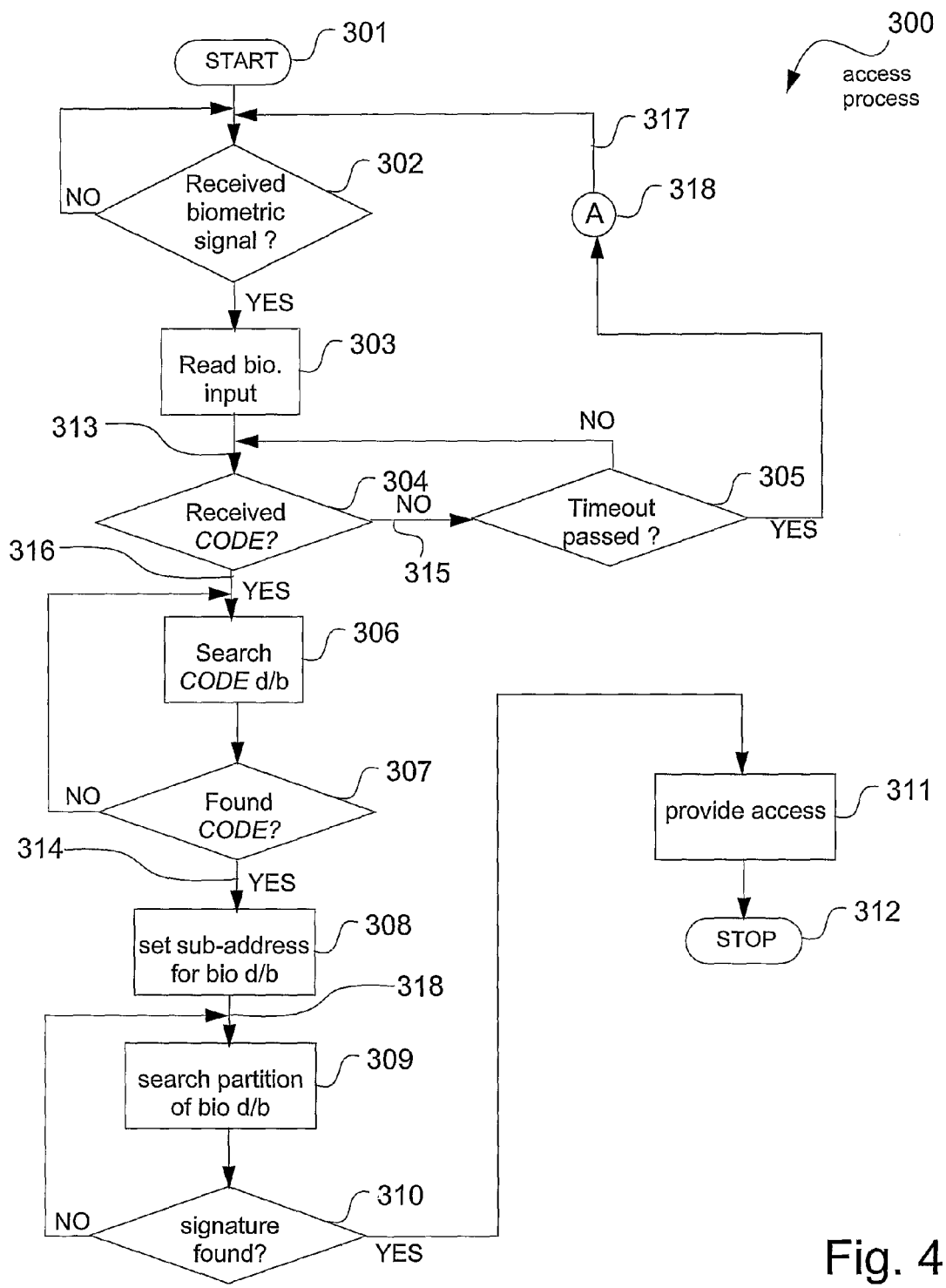
FIG. 4 shows one example of an access process by which the user can access the secured facility using the arrangement in FIG. 1.

FIG. 4 shows one example of an access process by which the user can access the secured facility using the arrangement in FIG. 1. The process 301 commences with a START step after which a testing step 302 determines if the biometric signal 101 has been received. If this is not the case, then the process 300 follows a NO arrow in a looping fashion back to the step 302. If, on the other hand, the biometric signal 101 has been received, then the process 300 follows a YES arrow to a step 303 in which the biometric detector 102 reads the biometric signal 101.

A following testing step 304 determines if the voice controlled memory partitioning input CODE 112 has been received by the microphone 108. If this is not the case, then the process 300 follows a NO arrow to a testing step 305 that determines if a timeout period has expired. If this is not the case, then the process 300 follows a NO arrow back to the step 304. If, on the other hand, the timeout has expired, then the process 300 follows a YES arrow to a connectivity symbol 318, and thereafter, the process 300 is directed back to the step 302 by an arrow 317.

Returning to the step 304, if the voice controlled memory partitioning CODE 112 has been received by the microphone 108, then the process 300 follows a YES arrow to a step 306 in which the processor 106 searches the voice pointer database 111 for the voice pointer matching the voice controlled memory partitioning CODE 112 received in the step 304. A following testing step 307 determines if the voice pointer (comprising a code word matching the voice controlled memory partitioning CODE 112) has been found in the database 111. If this is not the case, then the process 300 follows a NO arrow back to the step 306 which continues the search. If, on the other hand, the voice pointer has been found in the voice pointer database 111, then the process 300 follows a YES arrow from the step 307 to a step 308.

The step 308 determines the sub-address 202, this defining the partition 203 in the biometric signature database 104. Thereafter, in a step 309, the processor 106 searches the partition in the signature database 104 that has been defined by the sub-address set in the step 308 for the target biometric signature. A following testing step 310 determines if the target signature has been found. If this is not the case, then the process 300 follows a NO arrow back to the step 309 in which the search is continued. If, on the other hand, the target signature has been found, then the step 300 follows a YES arrow to a step 311. In the step 311 the processor 106 provides the access signal 110 via the interface 109 thereby giving the user access to the secure facility in question. The process 300 then terminates with a STOP step 312.

Figure 5:
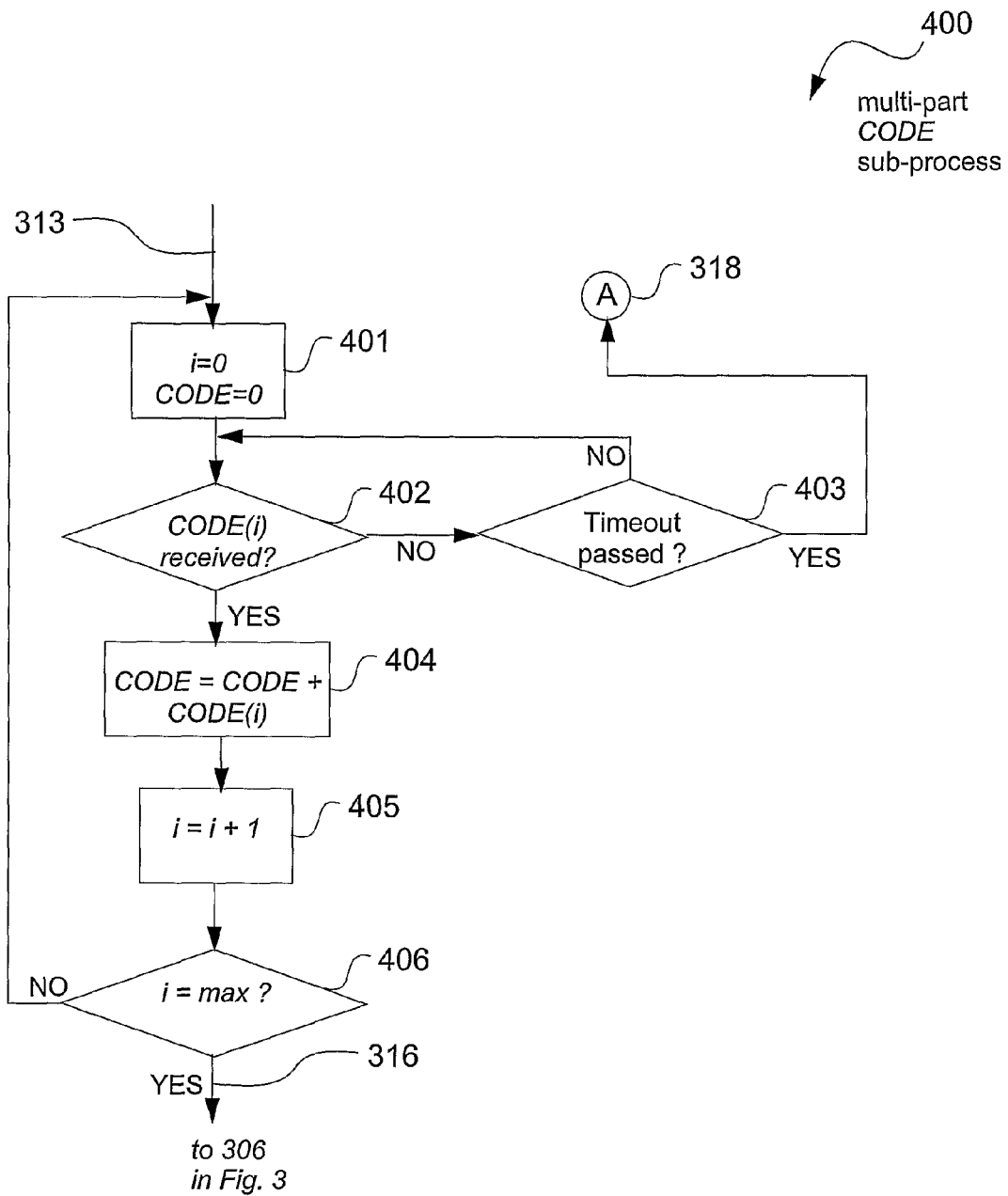
FIG. 5 shows an alternate embodiment in which the voice controlled memory partitioning input can be made up of several segments.

FIG. 5 shows an alternate embodiment in which the sub-address can be constructed from several voice pointers. In practice, this would enable the user to provide a series of voice controlled memory partitioning CODES 112, perhaps prompted by voice synthesised questions posed by the processor and presented to the user via the speakers 517.

The sub-process 400 commences with the arrow 313 that originates, in FIG. 4, from the step 303. In FIG. 5 the arrow 313 is directed to a step 401 that initialises a variable i and a parameter CODE. The parameter i is an index associated with a parameter max that defines the predetermined number of voice controlled memory partitioning CODES 112 to be provided, and hence the number of corresponding voice pointers that will comprise the sub-address defining the partition 203. The parameter CODE(i) is the presently constructed sub-address that is built up using the sub-process 400.

After initialisation in the step 401 the sub-process 400 is directed to a testing step 402 that determines whether the $i^{th}$ auxiliary CODE input has been received. If this is not the case, then the process 400 follows a NO arrow to a step 403 in which the processor 106 determines if a timeout has expired. If this is the case, then the process 400 follows a YES arrow to the connectivity symbol "A" (ie., 318) in FIG. 4. If, on the other hand, the timeout has not yet expired, then the process 400 follows a NO arrow from the step 403 back to the step 402. If, in the step 402, the $i^{th}$ auxiliary input has been received, then the process 400 follows a YES arrow to a step 404.

In the step 404 the processor 106 builds the sub-address 202 by, in one example, concatenating the $i^{th}$ voice pointer retrieved from the voice pointer database 111 as a result of receiving the $i^{th}$ voice controlled memory partitioning CODE 112, with the previously defined sub-address. A following step 405 increments the variable i, after which the process 400 is directed to a testing step 406. In the step 406 the processor 106 determines if the pre-defined number of voice pointers have now been received. If this is not the case, then the process 400 follows a NO arrow back to the step 401. If, on the other hand, all the voice pointers have now been received, this meaning that the sub-address has now been fully constructed, then the process 400 follows a YES arrow (ie., 316) back to the step 306 in FIG. 4.

Figure 6:
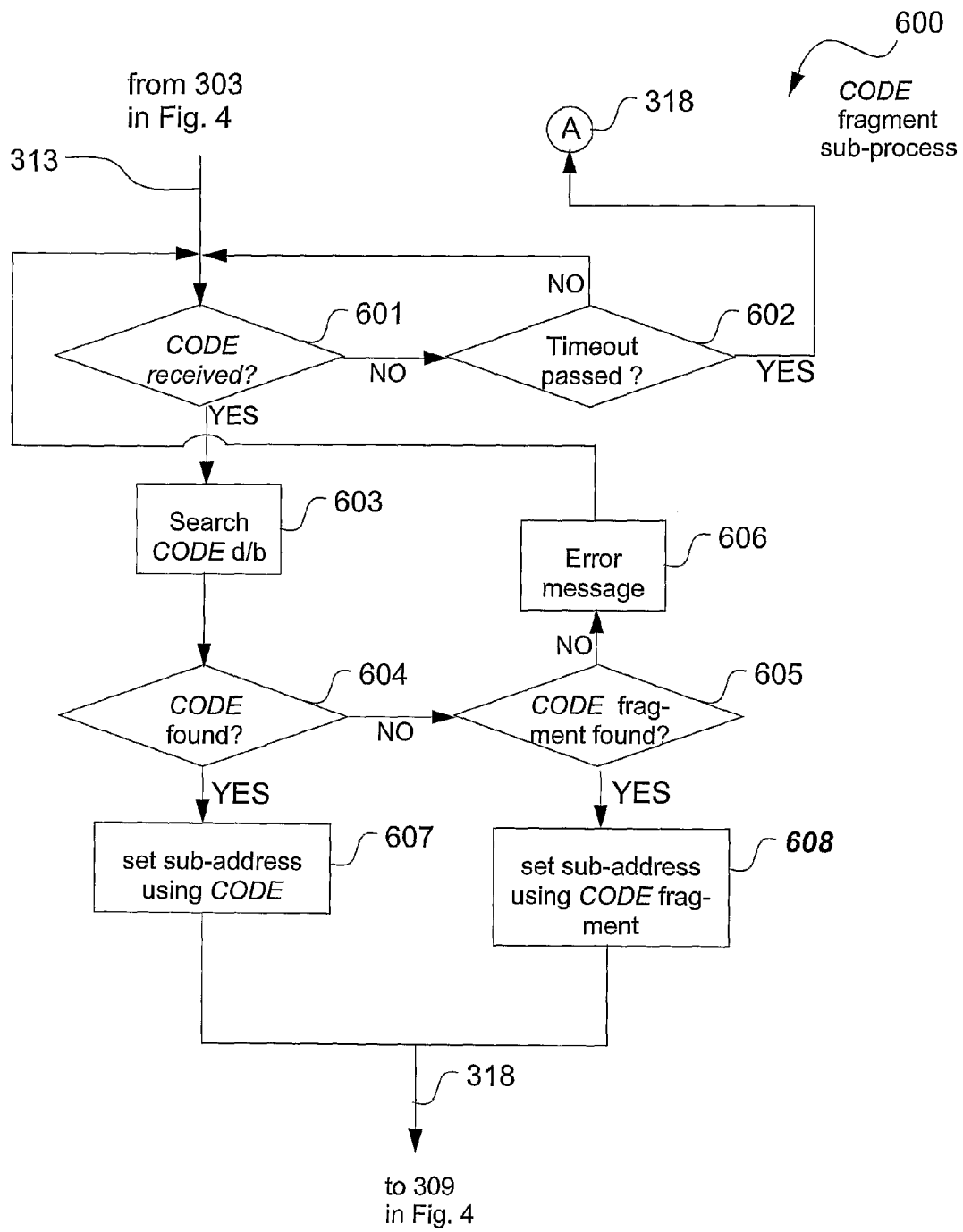
FIG. 6 shows an arrangement in which voice controlled memory partitioning is performed using an imperfectly recognised code.

FIG. 6 shows an arrangement 600 in which voice controlled memory partitioning is performed using an imperfectly recognised code. The sub-process 600 commences with the arrow 313 that originates in FIG. 4, from the step 303. In FIG. 6, the arrow 313 is directed to a testing step 601 in which the processor 106 in FIG. 1 checks whether a CODE word has been received. If this is not the case, then the process 600 follows a NO arrow to a step 602 which determines whether a timeout has passed. If this is not the case, then the process 600 follows a NO arrow back to the step 601. If, on the other hand, the step 602 determines that the timeout has passed, then the process 600 follows a YES arrow to the connectivity symbol "A" (ie., 318) in FIG. 4.

Returning to the step 601, if a CODE word has been received, then the process 600 follows a YES arrow to a step 603 in which the processor 106 searches the CODE database 111 in FIG. 1. In a following testing step 604 the processor 106 determines if a recognised CODE has been found in the database 111. If this is not the case, then the process 600 follows a NO arrow to a step 605 in which the processor 106 determines if a code fragment has been found in the CODE database 111. One example of a fragment is the fragment "C . . . " which is a fragment of a codeword "CAT". Code fragments may be recognised from fragments of the articulated sound at 112 in FIG. 1, whether these fragments fall at the beginning of the articulated sound 112, or elsewhere in the signal 112. If the processor 106 determines, in the step 605, that a CODE fragment has not been found, then the process 600 follows a NO arrow to a step 606 in which the processor 106 provides an error message to the user indicating that the auxiliary input 112 has not been recognised. The process 600 is then directed back to the step 601.

Returning to the step 604, if a legitimate CODE has been found, then the process 600 follows a YES arrow to a step 607 in which the processor 106 sets the sub-address for the biometric signature database 104 based upon the recognised CODE. The process 600 then follows the arrow 318 to the step 309 in FIG. 4.

Returning to the step 605, if the processor 106 recognises a CODE fragment in the CODE database 111, then the process 600 follows a YES arrow to a step 608. The step 608 sets the sub-address to the signature database 104 based upon the code fragment. The process 600 is then directed by the arrow 318 to the step 309 in FIG. 4.

The use of CODE fragments to determine a sub-address is explained according to the following example. If, for example, the CODE database 111 in FIG. 1 contains 100 separate codewords, four of which are words commencing with the letter "C", then if the complete CODE word is recognised at the step 604, then the sub-address will define a partition which is ¹/₁₀₀ of the signature database 104. If, on the other hand, only a CODE fragment "C . . ." is identified by the step 605, then the resultant sub-address set in the step 608 will establish a partition that is ⁴/₁₀₀ of the size of the signature database 104.

Figure 7:
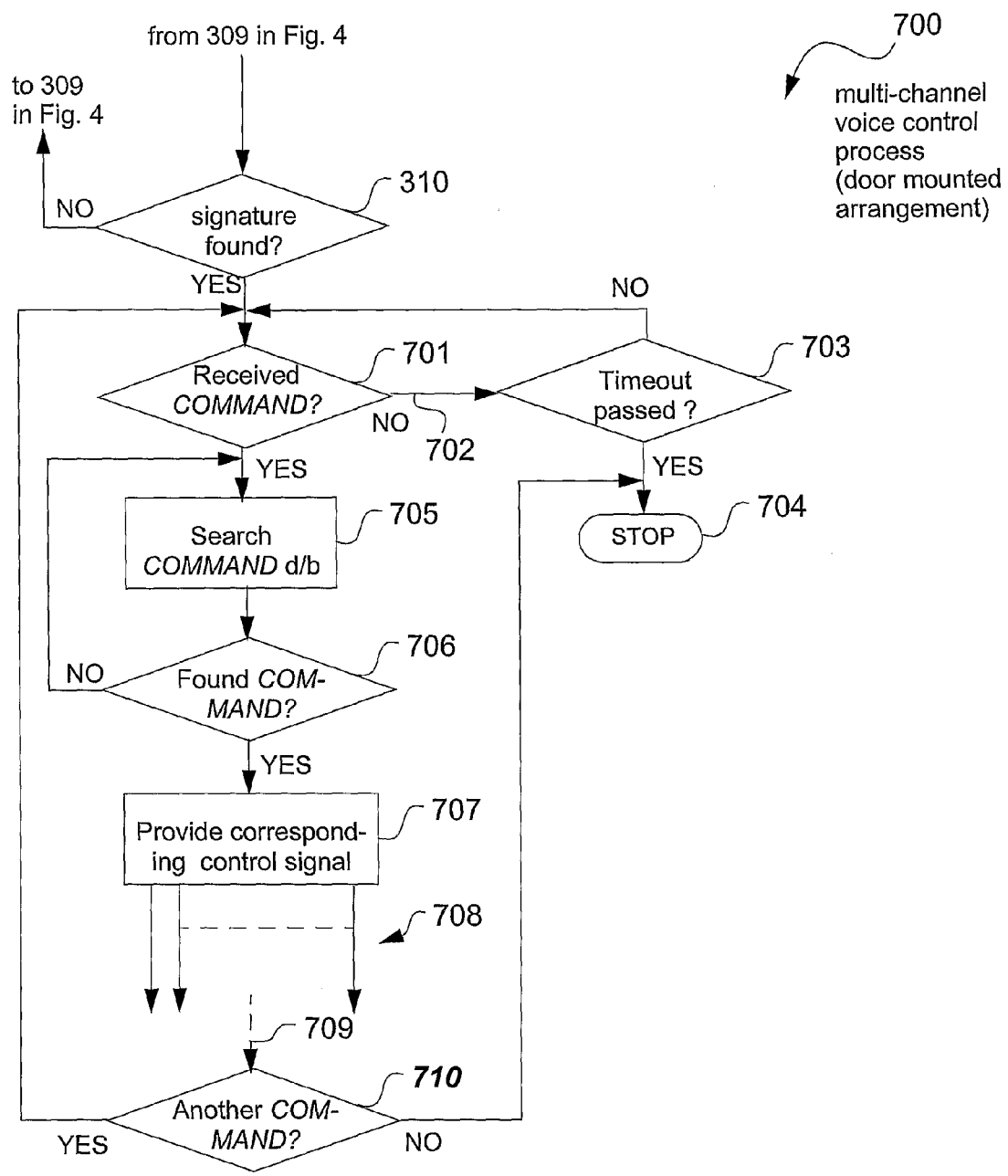
FIG. 7 shows an example of a process for a door-mounted multi-channel access and control arrangement using the disclosed voice controlled memory partitioning concept.

FIG. 7 shows an example of a process 700 for a door-mounted multi-channel access and control arrangement using the disclosed voice controlled memory partitioning concept. The process 700 commences if the step 310 in FIG. 4 determines that a signature has been found. In this event, the process 700 follows a YES arrow from the step 310 to a step 701, in which the processor 106 in FIG. 1 determines if a command, in the form of a voice input at 112 in FIG. 1, has been received. If this is not the case, then the process 700 follows a NO arrow to a step 703. In the step 703, the processor 106 determines if a timeout interval has passed. If this has occurred, then the process 700 follows a YES arrow from the step 703 to a termination step 704. If, on the other hand, the time out interval has not elapsed, then the process 700 follows a NO arrow from the step 703 back to the step 701 in a looping fashion.

Returning to the step 701, if a voice command has been received, then the process 700 follows a YES arrow to a step 705. In the step 705 the processor 106 searches the command database 113 in order to determine if the command database 113 contains a command which matches the command received by the step 701. A following step 706 determines, using the processor 106, if a matching command has been found in the database 113. While such a command has not been found, and while data still remains to be searched in the command database 113, the process 700 follows a NO arrow back to the step 705. Although not shown explicitly in FIG. 7 if the database 113 is completely searched without finding a matching command, then the process 700 provides an error message to the user and then terminates.

Returning to the step 706, if a command matching the input command is found in the database 113, then the process 700 follows a YES arrow to a step 707. The step 707 provides, as depicted by a set of arrows 708, an access and/or control signal corresponding to the particular matching command found in the database 113. Thereafter, as depicted by a dashed arrow 709, a step 710 determines if another command is to be anticipated. If this is the case, then the process 700 follows a YES arrow back to the step 701. If, on the other hand, another voice command is not anticipated, then the process 700 follows a NO arrow to the termination step 704.

Figure 8:
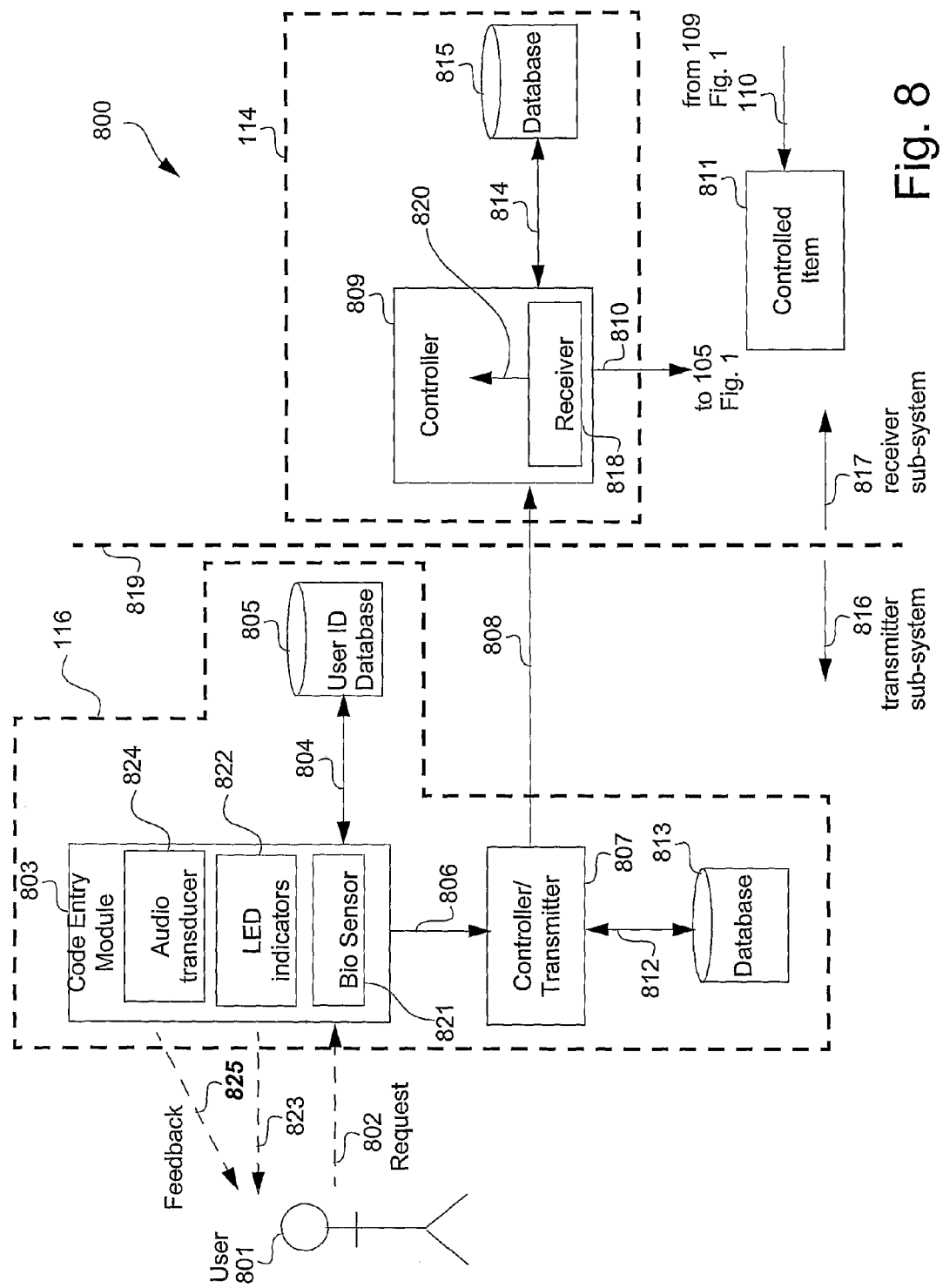
FIG. 8 is a functional block diagram of an arrangement for providing secure access according to the present disclosure.

FIG. 8 is a functional block diagram of an arrangement for providing secure access according to the present disclosure in which a portable fob is the remote access sub-system 116. A user 801 makes a request, as depicted by the arrow 802 (see FIG. 1), to a code entry module 803. The code entry module 803 includes a biometric sensor 821 and the request 802 takes a form which corresponds to the nature of the sensor 821 in the module 803. Thus, for example, if the biometric sensor 821 in the code entry module 803 is a fingerprint sensor, then the request 802 typically takes the form of a thumb press on a sensor panel (not shown) on the code entry module 803.

The code entry module 803 interrogates, as depicted by an arrow 804, a user identity database 805. Thus for example if the request 802 is the thumb press on the biometric sensor panel 821 then the user database 805 contains biometric signatures for authorised users against which the request 802 can be authenticated. If the identity of the user 801 is authenticated successfully, then the code entry module 803 sends a signal 806 to a controller/transmitter 807. The controller/transmitter 807 checks, as depicted by an arrow 812, the current rolling code in a database 813. The controller 807 then updates the code and sends the updated code, this being referred to as an access signal, as depicted by an arrow 808 to a controller 809. The rolling code protocol offers non-replay encrypted communication.

The controller 809 tests the rolling code received in the access signal 808 against the most recent rolling code which has been stored in a database 815, this testing being depicted by an arrow 814. If the incoming rolling code forming the access signal 808 is found to be legitimate, then the controller 809 sends a command, as depicted by an arrow 810, to the processor 106 as shown in FIG. 1. The processor can, provided that it is appropriate, provide the access signal 110 to the controlled item 811, as a result of receiving the signal 810 from the receiver sub-system 114. The controlled item 811 can be a door locking mechanism on a secure door, or an electronic key circuit in a personal computer (PC) that is to be accessed by the user 801.

The code entry module 803 can also incorporate a mechanism for providing feedback to the user 801. This mechanism can, for example, take the form or one or more Light Emitting Diodes (LEDs) 822 which can provide visual feedback, depicted by an arrow 823 to the user 801. Alternately or in addition the mechanism can take the form of an audio signal provided by an audio transducer 824 providing audio feedback 825.

The arrangement in FIG. 8 has been described for the case in which the secure code in the access signal 808 used between the sub-systems 816 and 817 is based upon the rolling code. It is noted that this is merely one arrangement, and other secure codes can equally be used. Thus, for example, either of the Bluetooth™ protocol, or the Wi Fi™ protocols can be used.

Rolling codes provide a substantially non-replayable non-repeatable and encrypted radio frequency data communications scheme for secure messaging. These codes use inherently secure protocols and serial number ciphering techniques which in the present disclosure hide the clear text values required for authentication between the key fob (transmitter) sub-system 816 and the receiver/controller 818/809.

Rolling codes use a different code variant each time the transmission of the access signal 808 occurs. This is achieved by encrypting the data from the controller 807 with a mathematical algorithm, and ensuring that successive transmissions of the access signal 808 are modified using a code and/or a look-up table known to both the transmitter sub-system 816 and the receiver sub-system 817. Using this approach successive transmissions are modified, resulting in a non-repeatable data transfer, even if the information from the controller 807 remains the same. The modification of the code in the access signal 808 for each transmission significantly reduces the likelihood that an intruder can access the information replay the information to thereby gain entry at some later time.

The sub-system 816 communicates with the sub-system 817 on the right hand side of the dashed line 819 via the wireless communication channel used by the access signal 808. The sub-system 817 is typically located in an inaccessible area such as a hidden roof space or alternately in a suitable protected area such as an armoured cupboard. The location of the sub-system 817 must of course be consistent with reliable reception of the wireless access signal 808.

The biometric signature database 805 is shown in FIG. 8 to be part of the transmitter sub-system 816. However, in an alternate arrangement, the biometric signature database 805 can be located in the receiver sub-system 817, in which case the communication 804 between the code entry module 803 and the signature database 805 can also be performed over a secure wireless communication channel such as the one used by the access signal 808. In the event that the secure access system is being applied to providing secure access to a PC, then the secured PC can store the biometric signature of the authorised user in internal memory, and the PC can be integrated into the receiver sub-system 817 of FIG. 8.

Typically, fob incorporates the user database 805, and only one biometric signature is stored in the fob. This arrangement reduces the requirements on the central database 815. Once the key fob authenticates the user through biometric signature (eg fingerprint) verification, the rolling code in the access signal 808 is transmitted to the controller 809 for authorization of the user for that location at that time.

The incorporation of the biometric sensor 821 into the code entry module 803 in the form of a remote key fob also means that if the user 801 loses the remote key fob, the user need not be concerned that someone else can use it. Since the finder of the lost key fob will not be able to have his or her biometric signal authenticated by the biometric sensor 821 in the code entry module 803, the lost key fob is useless to anyone apart from the rightful user 801.

The transmitter sub-system 816 is preferably fabricated in the form of a single integrated circuit (IC) to reduce the possibility of an authorised person bypassing the biometric sensor 821 in the code entry module 803 and directly forcing the controller 807 to emit the rolling code access signal 808.

Figure 9:
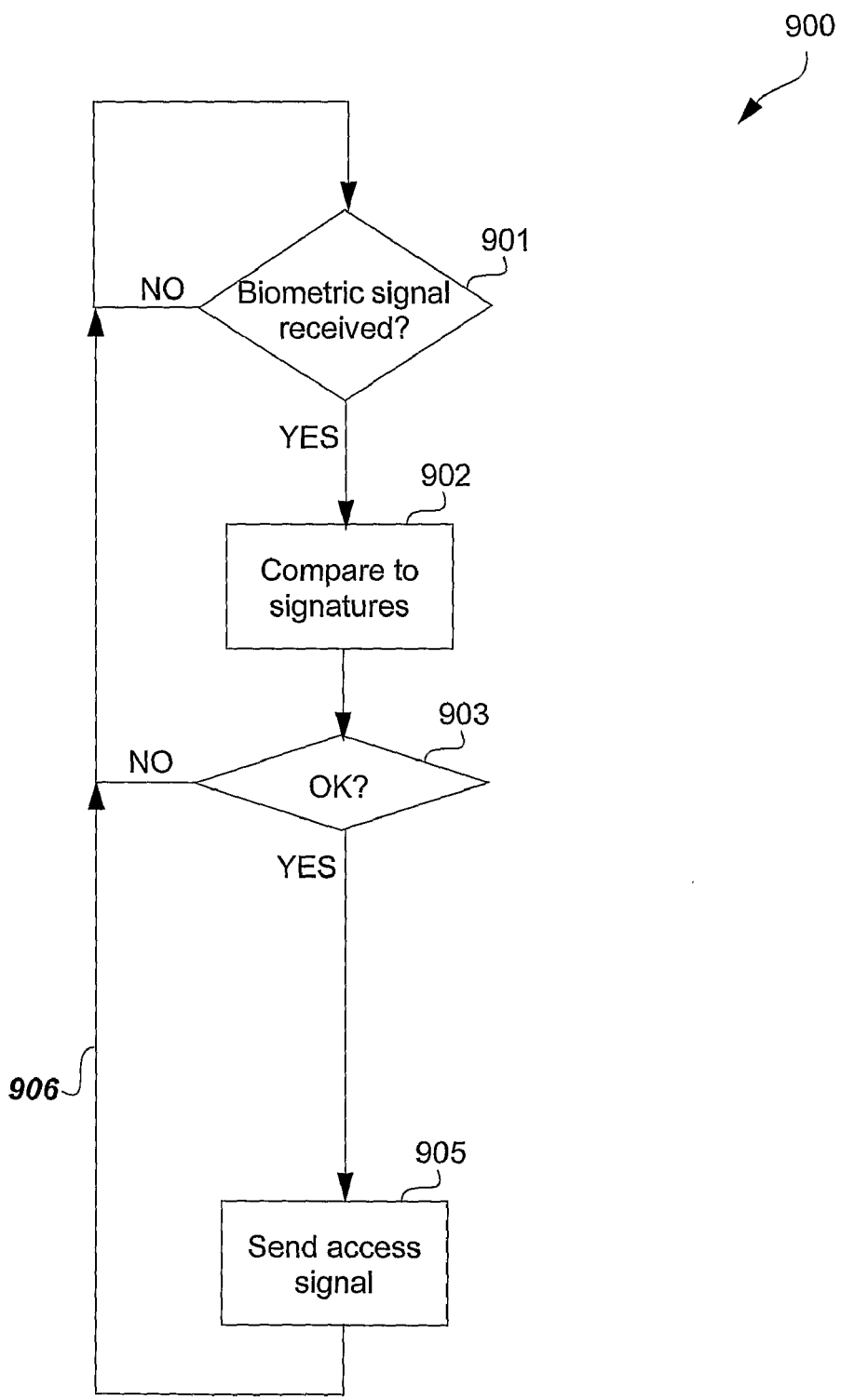
FIG. 9 shows an example of a method of operation of the remote control module of FIG. 8.

FIG. 9 shows a method 900 of operation of the remote control module (ie the transmitter sub-system 816) of FIG. 8. The method 900 commences with a testing step 901 in which the biometric sensor 821 in the code entry module 803 checks whether a biometric signal 802 is being received. If this is not the case, then the method 900 is directed in accordance with an NO arrow back to the step 901 in a loop. If, on the other hand, the biometric signal 802 has been received, then the method 900 is directed in accordance with a YES arrow to a step 902. The step 902 compares the received biometric signal 802 with information in the biometric signature database 805 in order to ensure that the biometric signal received 802 is that of the rightful user 801 of the sub-system 816.

A subsequent testing step 903 checks whether the comparison in the step 902 yields the desired authentication. If the biometric signature matching is authenticated, then the process 900 is directed in accordance with a YES arrow to a step 905. In the step 905 (as in a step 1103 in FIG. 11), the fob controller 807 sends the appropriate access signal 808 to the receiver controller 809. The process 900 is then directed in accordance with an arrow 906 back to the step 901.

Returning to the testing step 903, if the signature comparison indicates that the biometric signal 802 is not authentic, and has thus not been received from the proper user, then the process 900 is directed in accordance with a NO arrow back to the step 901. In an alternate arrangement, the NO arrow from the step 903 could lead to a disabling step which would disable further operation of the transmitter sub-system 816, either immediately upon receipt of the incorrect biometric signal 802, or after a number of attempts to provide the correct biometric signal 802.

On the transmitter sub-system side 816, the code entry module 803, the transmitter controller/transmitter 807 and the rolling code database 813, as well as the user ID database 805 are housed within the remote access module sub-system 116 (see FIG. 1). On the receiver sub-system side 817 the controller 809 as well as the database 815 are enclosed, as depicted by a dashed box 114, in the receiver sub-system (see FIG. 1).

Figure 10:
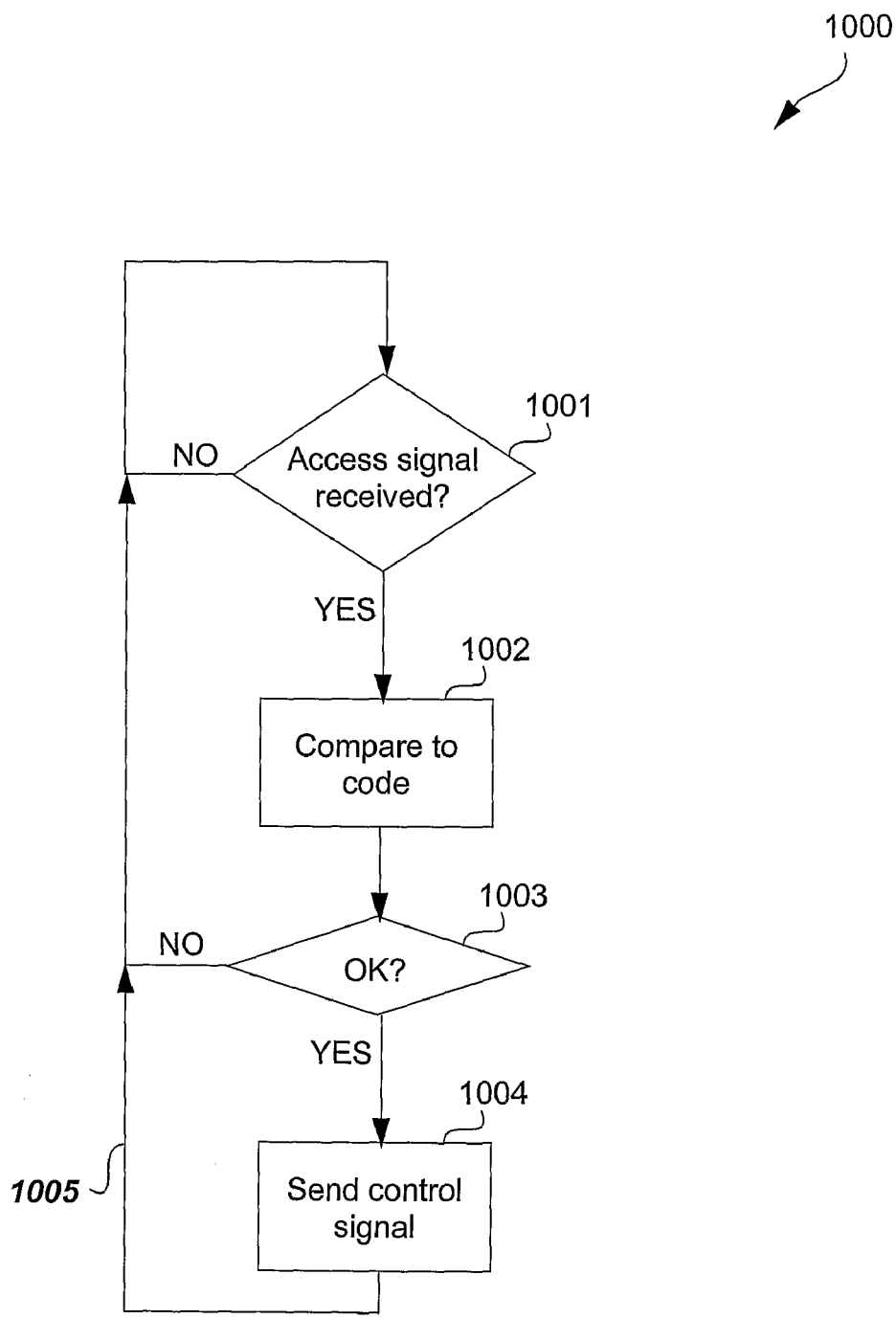
FIG. 10 shows an example of a method of operation of the (fixed) control device of FIG. 8.

FIG. 10 shows a method 1000 of operation of the receiver sub-system 817 of FIG. 8. The method 1000 commences with a testing step 1001 which continuously checks whether the access signal 808 has been received from the transmitter controller 807. The step 1001 is performed by the receiver controller 809. As long as the access signal 808 is not received the process 1000 is directed in accordance with a NO arrow in a looping manner back to the step 1001. When the access signal 808 is received, the process 1000 is directed from the step 1001 by means of a YES arrow to a step 1002. In the step 1002, the receiver controller 809 compares the rolling code received by means of the access signal 808 with a reference code in the receiver rolling code database 815. A subsequent testing step 1003 is performed by the receiver controller 809. In the step 1003 if the code received on the access signal 808 is successfully matched against the reference code in the database 815 then the process 1000 is directed in accordance with a YES arrow to a step 1004.

In the step 1004 the receiver controller 809 sends the control signal 810 to the processor system 100 in FIG. 1, which consequently sends the access signal 110 to controlled item 811 (for example opening the secured door). The process 1000 is then directed from the step 1004 as depicted by an arrow 1005 back to the step 1001. Returning to the testing step 1003 if the code received on the access signal 808 is not successfully matched against the reference code in the database 815 by the receiver controller 809 then the process 1000 is directed from the step 1003 in accordance with a NO arrow back to the step 1001.

As was described in regard to FIG. 9, in an alternate arrangement, the process 1000 could be directed, if the code match is negative, from the step 1003 to a disabling step which would disable the receiver sub-system 817 if the incorrect code where received once or a number of times.

Figure 11:
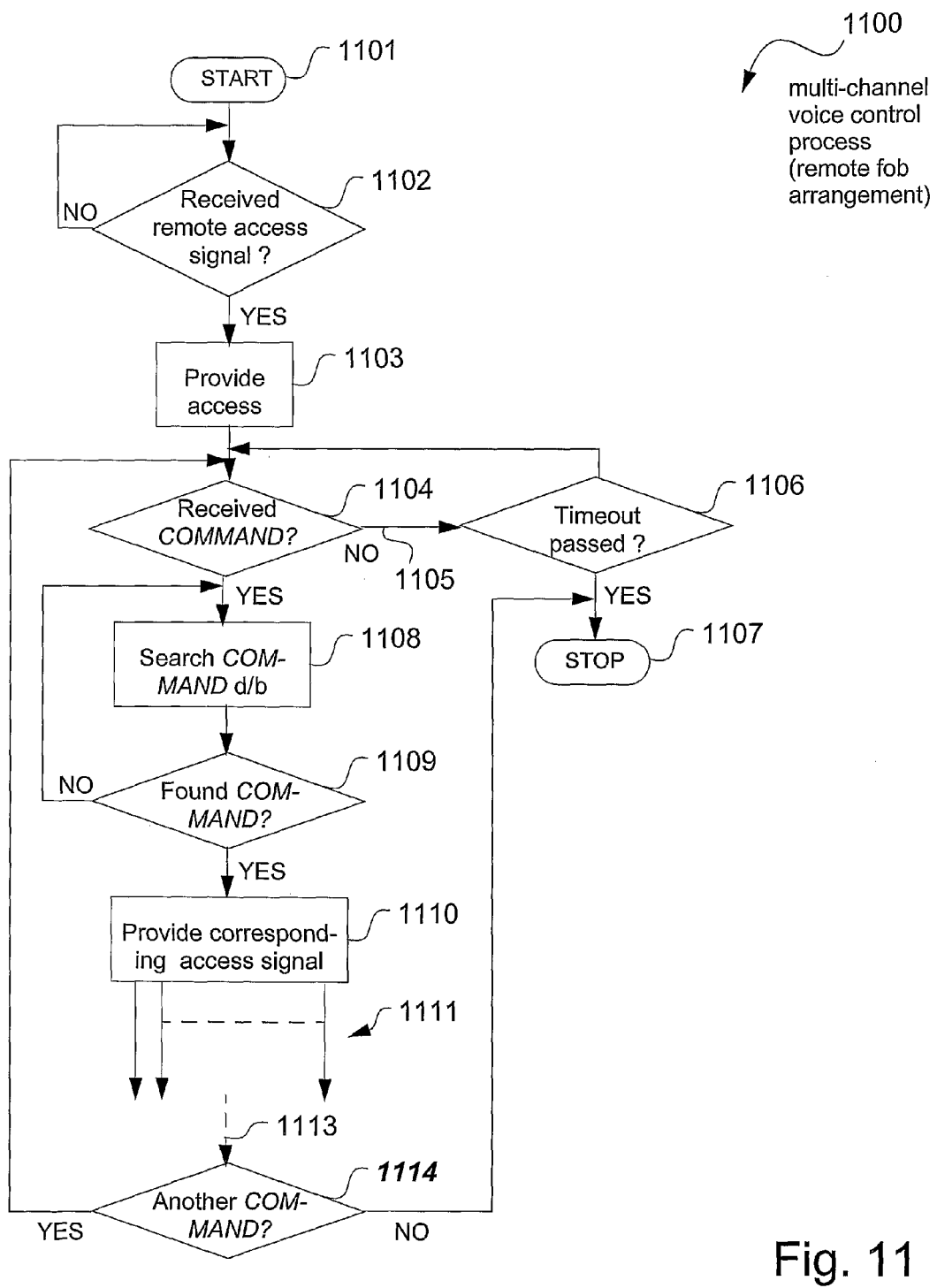
FIG. 11 shows an example of a process for a remote fob multi-channel access and control arrangement.

FIG. 11 shows an example of a process 1100 for the remote fob multi-channel access and control arrangement 800 in FIG. 8. The process 1100 commences with a start step 1101 after which in a step 1102 the processor 106 determines if a remote access signal 810 (see FIG. 8) has been received from the receiver sub-system 114 (see FIG. 1). If this is not the case, then the process 1100 follows a NO arrow back to the step 1102 in a looping fashion. If, on the other hand, a remote access signal 810 has been received from the receiver sub-system 114, then the process 1100 follows a YES arrow to a step 1103 which provides the necessary access to the secure facility. The step 1103 provides the access to the secure facility by providing the access signal 110 (see FIGS. 1,8) to the controlled item 811.

After access is provided by the step 1103, a following step 1104 determines, using the processor 106, if a voice command, depicted by the arrow 112 in FIG. 1, has been received. If this is not the case, then the process 1100 follows a NO arrow to a step 1106, in which the processor 106 determines if a timeout interval has passed. If this is the case, then the process 1100 follows a YES arrow to a termination step 1107. If, on the other hand, the timeout interval has not elapsed, then the process 1100 follows a NO arrow from the step 1106 back to the step 1104 in a looping fashion.

Returning to the step 1104, if a voice command 112 has been received, then the process 1100 follows a YES arrow to a step 1108 in which the processor 106 searches the command database 113 to see if the database 113 contains a command which matches the command received by the step 1104. A following step 1109 determines the outcome of the searching activity by the step 1108, and if a matching command is not found, and if the command database 113 still has data to search, then the process 1100 follows a NO arrow from the step 1109 back to the step 1108 in a looping fashion. Although not explicitly shown in FIG. 11, if the database 113 contains no more data to search, and if a matching command is not found, then the step 1109 provides an error message to the user.

Returning to the step 1109, if a command matching the input command is found, then the process 1100 follows a YES arrow to a step 1110. In the step 1110, the processor 106 provides one of a set of signals 1111 which corresponds, according to a mapping provided in the command database 113, to the particular command received by the step 1104. Thereafter, as depicted by a dashed arrow 1113, the processor 106 in FIG. 1 determines in a step 1114 if another voice command is anticipated. If this is the case, then the process 1100 follows a YES arrow from the step 1114 back to the step 1104. If, on the other hand, another command is not anticipated, then the process 1100 follows a NO arrow from the step 1114 to the termination step 1107.

Although the description relating to FIG. 11 depicts that access is provided by the step 1103 prior to operation of the voice command process, in another arrangement, the voice commands can be given prior to provision of the access request 802 being provided to the biometric sensor 821 in the fob 803. In this case, the aforementioned commands are stored by the processor 106 in the memory 103 however the corresponding control signals 1114 (or 708) are not output until after the biometric authentication process takes place.

INDUSTRIAL APPLICABILITY

It is apparent from the above that the arrangements described are applicable to the security industries.

The foregoing describes only some embodiments of the present invention, and modifications and/or changes can be made thereto without departing from the scope and spirit of the invention, the embodiments being illustrative and not restrictive.

The claims defining the invention are as follows:

1. A computer-implemented method of authenticating a physiological biometric signal of an individual selected from a fingerprint, retinal eye pattern or face, the method comprising the steps of:
   receiving the biometric signal to be authenticated against a matching signature in a signature database;
   receiving a non-secure vocally uttered code;
   reducing, depending upon even an imperfectly recognized vocally uttered code, the memory space in the signature database that needs to be searched to a memory partition in the signature database; and
   searching the memory partition for the matching signature to identify and authenticate the individual.

2. A computer-implement method according to claim 1, wherein the reducing step comprises the steps of:
   searching a voice code database for a voice code that matches the vocally uttered code;
   constructing, if the matching voice code is found in the voice code database, a sub-address to the memory partition dependent upon the matching voice code; and
   limiting, according to the sub-address, that part of the signature database that needs to be searched for the matching signature to the memory partition.

3. A computer-implement method according to claim 1, further comprising, prior to the searching step, the steps of:
   receiving a further vocally uttered code; and
   reducing, dependent upon the further vocally uttered code, the memory space of said partition to be searched for the matching signature.

4. A computer-implement method according to claim 1, further comprising, prior to the step of receiving the vocally uttered code, the further step of:
   providing a voice prompt to elicit the vocally uttered code.

5. A computer-implement method according to claim 1, further comprising the steps of:
   receiving a vocally uttered command;
   determining, dependent upon the received voice command, a corresponding one of a plurality of access and control output signals; and
   providing, if the matching signature is found, the corresponding one of said plurality of access and control output signals.

6. A computer-implement method according to claim 1, further comprising the steps of:
   receiving a non-secure vocally uttered command; and
   if said matching signature is found, determining, dependent upon the received non-secure voice command, a corresponding one of a plurality of access and control output signals.

7. An apparatus for authenticating a physiological biometric signal of an individual selected from a fingerprint, retinal eye pattern or face, the system comprising:
   a biometric detector for receiving the biometric signal to be authenticated against a matching signature in a signature database;
   a microphone for receiving a non-secure vocally uttered code;
   a memory for storing a program; and
   a processor for executing the program, said program comprising:
   code for reducing, dependent upon even an imperfectly recognized vocally uttered code, the memory space in the signature database that needs to be searched to a memory partition in the signature database; and
   code for searching the memory partition for the matching signature to identify and authenticate the individual.

8. An apparatus according to claim 7, wherein the code for reducing that part of the signature database that needs to be searched comprises:
   code for searching a voice code database for a voice code that matches the vocally uttered code;
   code for constructing, if the matching voice code is found in the voice code database, a sub-address to the memory partition dependent upon the matching voice code; and
   code for limiting, according to the sub-address, that part of the signature database that needs to be searched for the matching signature to the memory partition.

9. An apparatus according to claim 7, further comprising:
   code for receiving a further vocally uttered code; and
   code for reducing, dependent upon the further vocally uttered code, the memory space of said partition to be searched for the matching signature.

10. An apparatus according to claim 7, further comprising:
    code for providing a voice prompt to elicit the vocally uttered code.

11. An apparatus according to claim 7, further comprising:
    code for receiving a vocally uttered command;
    code for determining, dependent upon the received voice command, a corresponding one of a plurality of access and control output signals; and
    code for providing, if the matching signature is found, the corresponding one of said plurality of access and control output signals.

12. An apparatus according to claim 7, further comprising:
    code for searching a signature database for a signature matching the biometric signal;

wherein said microphone is configured for, if said matching signature is found, determining, dependent upon the received non-secure voice command, a corresponding one of a plurality of access and control output signals.

13. A computer program readable non-transitory storage medium having recorded thereon a computer program for directing a processor to execute a method of authenticating a physiological biometric signal of an individual selected from a finger print, retinal eye pattern or face, the program comprising:

code for receiving the biometric signal to be authenticated against a matching signature in a signature database;

code for receiving a non-secure vocally uttered code;

code for reducing, dependent upon even an imperfectly recognized vocally uttered code, the memory space in the signature database that needs to be searched to a memory partition in the signature database; and code for searching the memory partition for the matching signature to identify and authenticate the individual.

* * * * *